Patented Feb. 16, 1954

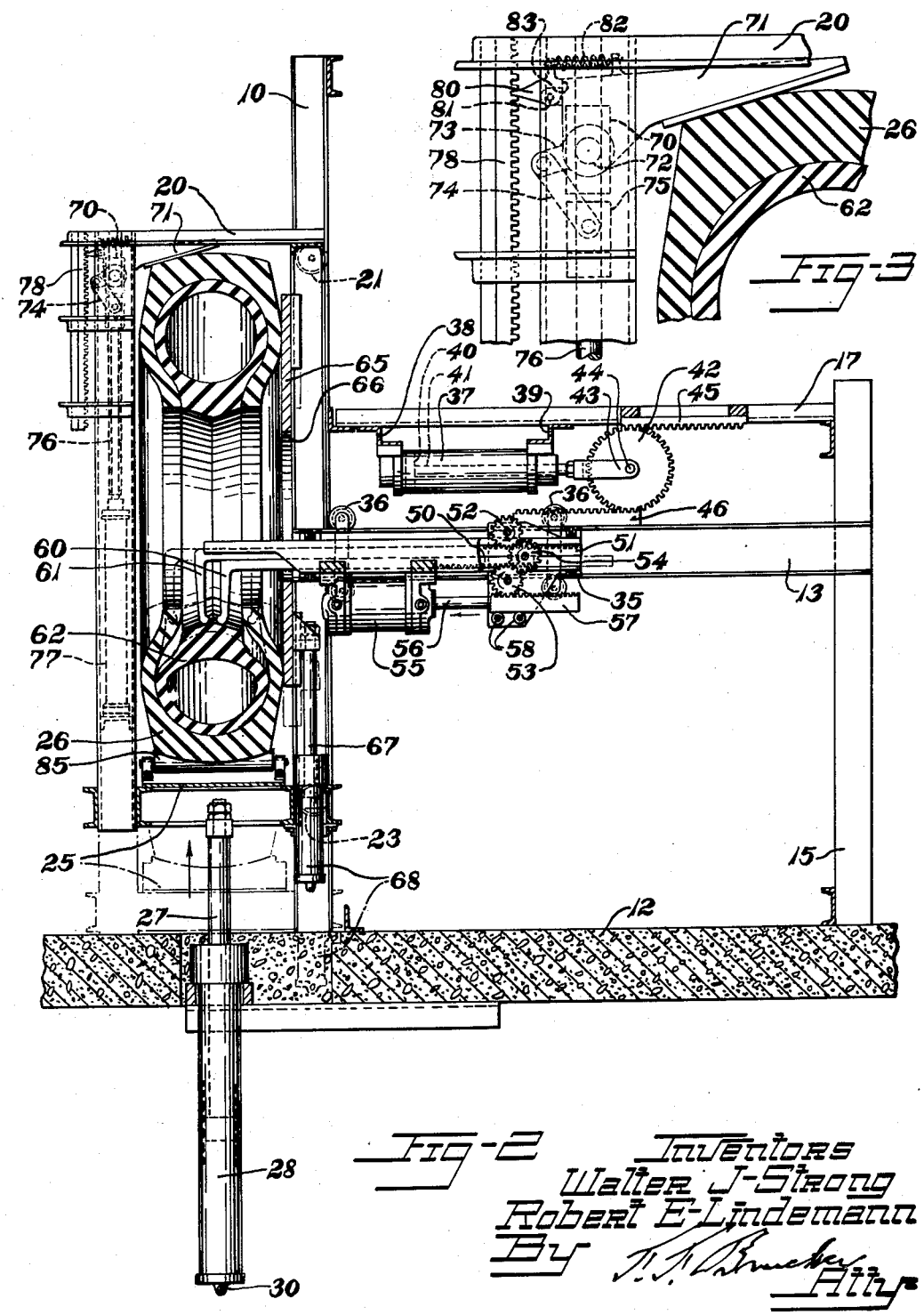

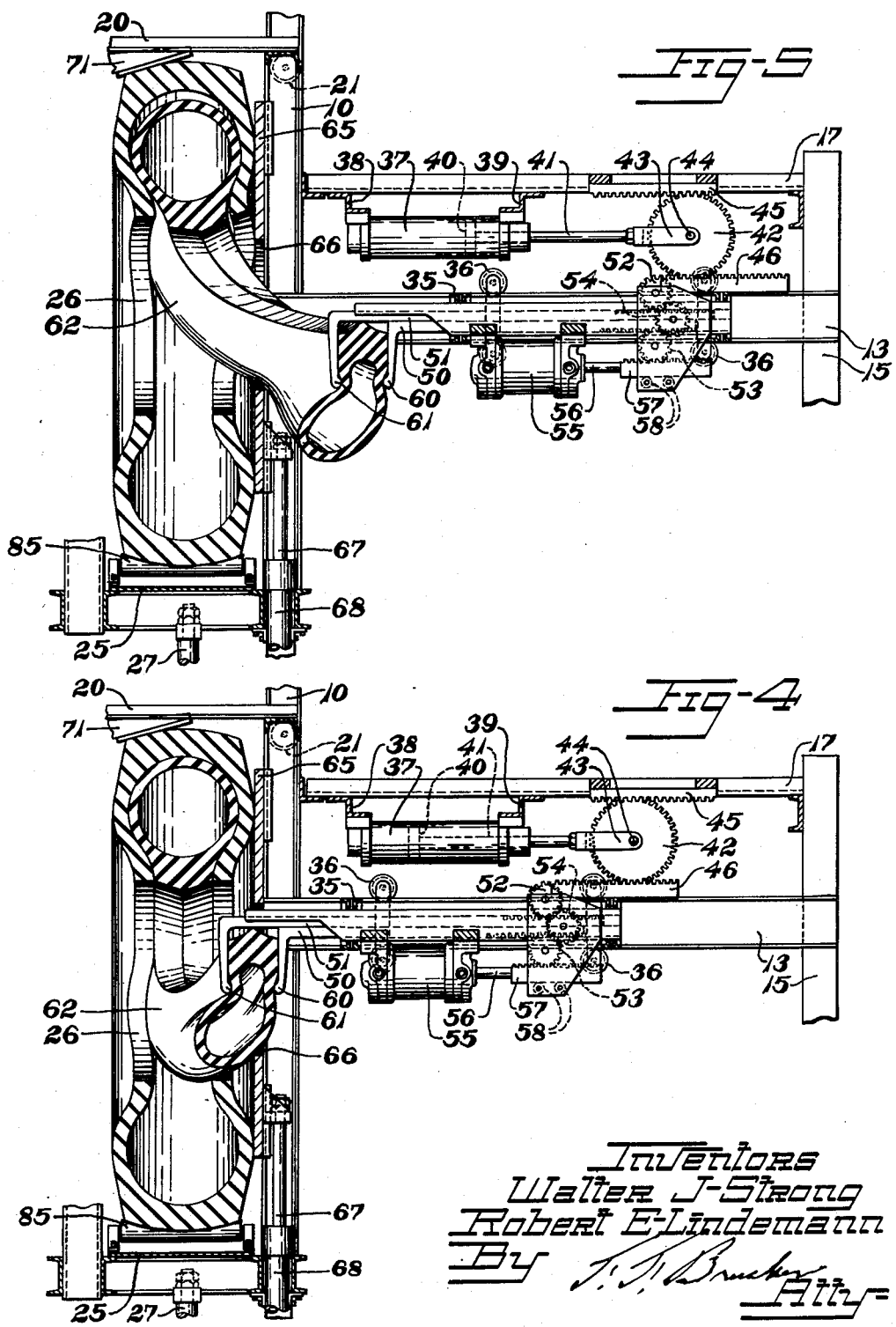

2,668,983

UNITED STATES PATENT OFFICE 2,668,983

METHOD AND APPARATUS FOR REMOVING CURING BAGS FROM TIRES

Walter J. Strong, Cuyahoga Falls, and Robert E. Lindemann, Leroy, Ohio, assignors to The B. F. Goodrich Company, New York, N. Y., a corporation of New York Application April 2, 1951, Serial No. 218,874

12 Claims. (Cl. 18—2)

This invention relates to the method of and apparatus for removing curing bags from tire casings.

In the manufacture of open-bellied tire casings it has been the usual practice to cure or vulcanize the casing while it is supported from within by an inflatable rubber bag filled with air, steam, hot water or other fluid under pressure. After vulcanization of the casing the bag must be removed from it without damage to the bag or the tire casing.

In order to provide a relatively stiff molding surface presented against the inner surface of the tire casing so as to smooth the inner surface, the curing bags are of relatively thick-walled construction. Generally the thicker and stiffer the bag, the more difficult it is to remove it from the tire casing. Tire manufacturers have of late years produced larger and larger tires for special uses such as on road-building machinery, airplanes, trucks and busses, and as such tires have increased in size, the size of the curing bags has been increased proportionately and the problems of providing for removal of the curing bags has become more difficult. As both the tire casings and the curing bags have become larger they have become stiffer and heavier requiring a greater amount of power to handle them. It has therefore become desirable to provide for handling the heavy tire casings by power-operated mechanism and to so simplify the movements of the bag puller as more effectively to accomplish the bag-pulling operation with a minimum use of power.

The present invention has for an object the removal of curing bags from the larger sizes of tire casings without objectionable damage to the casing.

Other objects are to provide for quick adjustment of the apparatus both during removal of the curing bag and in placement of the casing in bag-pulling position, to reduce manual effort in handling of the large casings, and to simplify movement and construction of the pulling mechanism.

These and other objects will appear from the following description and the accompanying drawings.

Of the drawings,

Fig. 2 is a sectional view thereof, taken on line 2—2 of Fig. 1.

Fig. 3 is an enlarged detail view of the hold-down mechanism.

Fig. 4 is a sectional view similar to Fig. 2 showing the bag as partially removed from the casing.

Fig. 5 is a similar view showing a more advanced stage of the removal of the bag.

Figure 1:
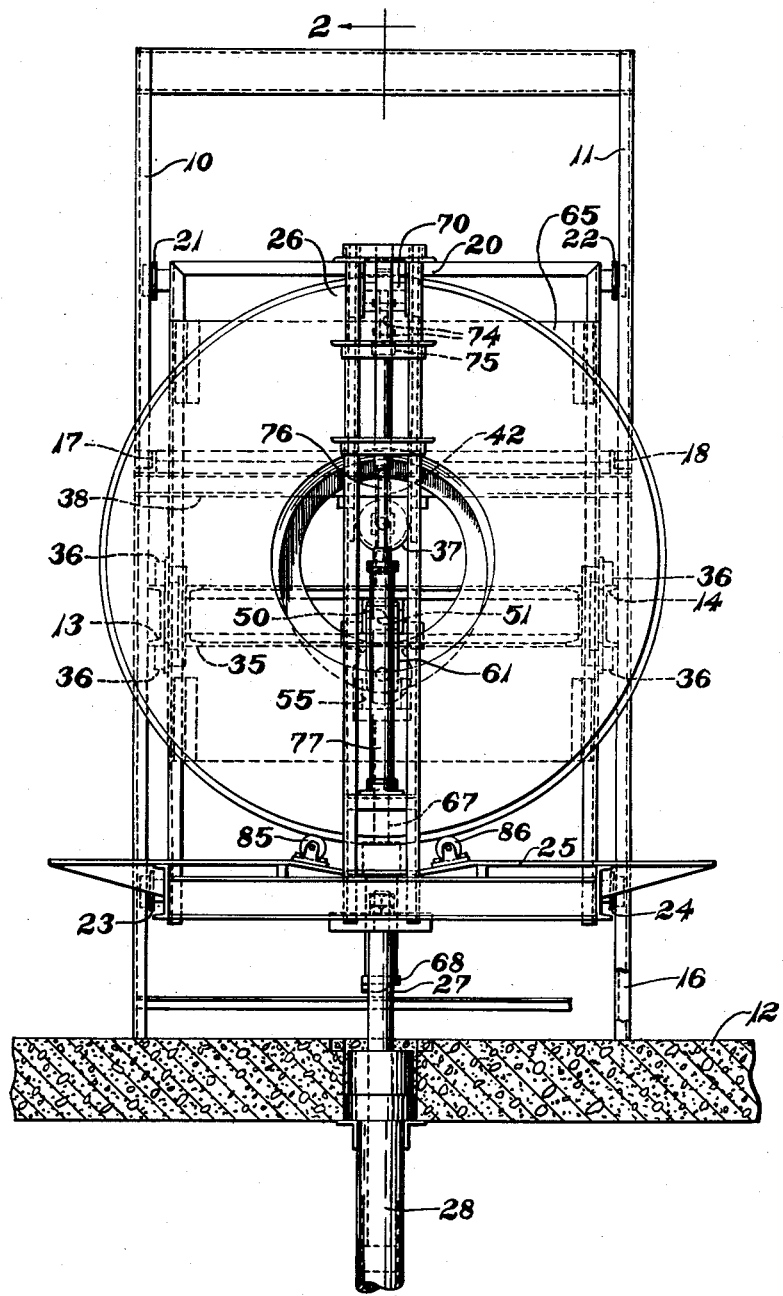
Fig. 1 is a front elevation of apparatus constructed in accordance with and embodying the invention, parts being broken away.

Referring to the drawings, the numerals 10, 11 designate a pair of vertical columns of channel cross-section arranged in parallel spaced-apart relation and secured at their lower ends to a floor 12. A pair of horizontal frame members of channel cross-section 13, 14 are secured at one end to columns 10, 11 respectively and at their other ends are supported by vertical frame members 15, 16. Other horizontal frame members 17, 18 parallel thereto also connect columns 10, 11 to frame members 15, 16.

An elevator cage 20 is mounted at the opposite side of columns 10, 11 and is guided vertically thereby, there being guide rollers 21, 22, 23, 24 on the cage for rolling movement along the channel columns. The cage has a platform 25 for supporting a tire casing 26. A ram 27 supports the cage 20 from a vertical ram cylinder 28 secured below the floor 12 and connected to a supply of fluid under pressure (not shown) by a pipe 30 controlled by a three-way valve (not shown). The arrangement is such that the tire casing 26 may be raised and lowered by the elevator with respect to the bag-puller.

For supporting the bag-puller for movement along a straight path, a carriage 35 has wheels 36 for engaging the frame members 13, 14 for horizontal movement therealong toward and from the tire casing in a direction axial thereof. For moving the carriage, a pressure fluid operated cylinder 37 is fixed to cross frame members 38, 39 which are in turn secured to frame members 17, 18.

The cylinder 37 has a piston 40 and piston rod 41 to which a gear 42 is secured by a fork 43 and a pin 44 for free rotation. A rack 45 is fixed to frame members 17, 18, by cross members and a similar rack 46 is fixed to carriage 35. The arrangement is such that movement of piston 40 to the right as seen in Fig. 2 rolls gear 42 along and in mesh with rack 45 causing the rack 46 also meshed with the gear to move to the right along a straight path and with it the carriage 35, the movement of the carriage being twice the movement of the piston in distance.

Mounted on the carriage 35 for independent sliding movement relative thereto in the direction of movement of the carriage are a pair of bars 50, 51. These have rack teeth thereon for engaging a pair of pinions 52, 53 of equal size rotatably mounted on stub shafts secured to carriage 35. A third pinion 54 similarly mounted on the carriage between pinions 52, 53 meshes therewith. For rotating the pinions, a pressure fluid operated cylinder 55 is fixed to carriage 35 and its piston rod 56 is secured to a rack 57 guided by rollers 58. Rack 57 meshes with pinion 53.

Bars 50, 51 are formed at one end thereof with gripper fingers 60, 61 respectively. The arrangement is such that movement of piston rod 56 moves the gripper fingers 60, 61 toward and from each other independent of the position of carriage 35. In pulling a bag 62 from a tire casing 26 the fingers 60, 61 may grip a portion of the bag and draw the bag through the wheel-engaging opening of the tire to one side of the tire.

For supporting the side of the tire, bracing means such as a plate 65 having vertical sliding movement along columns 10, 11 is provided. It has a central aperture 66 through which the bag-gripping fingers extend. The bracing means may be raised and lowered to accommodate and align its aperture with tire casings of different sizes and for this purpose is fixed to the piston rod 67 of a vertical pressure fluid operated cylinder 68 mounted on the elevator platform 25. The arrangement is such that the plate 65 may rise and fall with the elevator or may be adjusted in relation thereto.

For holding down the top of the casing 26 a sliding carriage 70, see Fig. 3, is mounted on the elevator cage 20 for vertical movement. A hold-down arm 71 is pivotally mounted thereon as by a cross pin 72. Arm 71 has a short arm 73 secured thereto which is pivotally connected by a pair of links 74, 74 to a cross-head 75. The cross-head is secured to the piston rod 76 of a fluid pressure operated cylinder 77 secured to the elevator frame. A rack 78 is also secured to the elevator cage and is engaged by a pawl 80 pivotally mounted at 81 on arm 71. A coil spring 82 normally holds a shoulder 83 of pawl 80 against rotation about its pivot in a clockwise direction as seen in Fig. 3 by contact with arm 71 but permits rotation in the opposite direction by tensioning the spring. In the absence of a tire, arm 71 may drop a limited distance by rotation about its pivot releasing pawl 80 from rack 78 and permitting carriage 70 to drop. Such rotation and downward movement of carriage 70 is limited by cross-head 75 so that arm 71 does not drop enough to incline it greatly from a generally horizontal position. Lowering of rod 76 and cross-head 75 will then lower arm 71 until it rests upon a tire 26. Whereupon, the arm 71 will be rotated sufficiently by resistance of the tire to movement to engage pawl 80 in rack 78 and lock the arm against upward movement. Cross-head 75 and with it carriage 70 and arm 71 may be raised by rod 76 as pawl 80 may give way by counterclockwise movement, tensioning spring 82.

To facilitate rotative adjustment of the tire casing on the elevator platform 25, the platform is provided with a pair of free-running rollers 85, 86.

The operation of the apparatus is as follows: A tire casing 26 is rolled onto the elevator platform 25 where it is centered over the rollers 85, 86. The hold-down arm 71 is then lowered until it rests upon the top of the tire casing. The plate 65 is then raised or lowered to center its opening 66 with the tire casing. The elevator is then raised until the opening 66 is in position to clear the gripper fingers. Carriage 35 is then advanced to the left in Fig. 2 along a straight path to the position there shown with its gripper fingers over the curing bag. The elevator is then raised slightly to move the casing diametrically and to depress the bag and the fingers then to spread the bead portions of the casing and to permit that portion of the curing bag to enter the space between the fingers. The fingers are then closed to grip the bag. Now the elevator is lowered to expose the gripped portion within the central opening of the casing, as shown in Fig. 4 and the gripper is withdrawn through opening 66 drawing the lower portion of the bag through the opening as seen in Fig. 4. Then the elevator is again raised as the grippers are further withdrawn thereby drawing the bag from the upper portion of the tire. After the bag is withdrawn, the gripper fingers are separated to release it, the elevator is lowered to its original position, the hold-down arm 71 is raised and the tire casing is rolled from the elevator.

The apparatus is especially useful in handling tire casings of large size as the casing may be manipulated to move it diametrically of the casing during the pulling operation as desired without great physical exertion on the part of the operator, it being possible to move the casing diametrically in opposite directions alternately. At the same time the bag gripping fingers being mounted for movement along a straight path axially of the casing may be of relatively simple construction and require a minimum of power for moving them. This also greatly strengthens the bag-pulling mechanism and provides for independent manipulation thereof relative to movement of the casing.

Variations may be made without departing from the scope of the invention as it is defined by the following claims.

We claim:

1. The method of removing a curing bag from an annular tire casing which comprises supporting a side face of the casing entirely about its central wheel-engaging opening, gripping a portion of the bag exposed at said opening, withdrawing the gripped portion by movement along a straight line in a direction axially of the casing toward its supported side face, and moving the casing in a direction diametrical of the casing while continuing to grip said portion to remove the remainder of the bag from the casing.

2. The method of removing a curing bag from an annular tire casing which comprises supporting a side face of the casing continuously about its central wheel-engaging opening, gripping a portion of the bag exposed at said opening, moving the casing in a direction diametrical of the casing while gripping said portion of the bag to expose said portion within the central opening of the casing, withdrawing said portion beyond the casing at the supported side face thereof by movement of said gripped portion along a straight line, and moving the casing in the opposite diametrical direction while holding the gripped portion beyond said side face to withdraw the remainder of the bag from the casing.

3. The method of removing a curing bag from an annular tire casing which comprises supporting a side face of the casing continuously about an aperture of a plate, gripping an exposed portion of the curing bag, drawing the gripped portion of the bag along a straight path through the aperture of the plate, and moving the casing and the plate in the same direction diametrical of the casing while continuing to grip said portion of the bag to withdraw the remainder of the bag from the casing through the aperture of the plate.

4. Apparatus for removing a curing bag from an annular tire casing, said apparatus comprising a bracing structure including an apertured plate for supporting a side face of the casing entirely about its central wheel-engaging opening, clamping means for gripping a portion of the bag exposed at said opening, said clamping means being mounted for bodily movement along a straight path in a direction axial of the casing, means for withdrawing the clamping means with the gripped portion of the curing bag in a direction toward the supported side face of the casing and through the aperture in said plate, and means for moving the casing in a direction diametrical of the casing while said portion is so gripped to remove the remainder of the bag from the casing.

5. Apparatus for removing a curing bag from an annular tire casing, said apparatus comprising an apertured plate for supporting a side face of the casing entirely about its central wheel-engaging opening, clamping means for gripping a portion of the bag exposed at said opening, said clamping means being mounted for bodily movement along a straight path in a direction axial of said casing through said opening, means for moving the casing in a direction diametrical of the casing to expose the gripped portion of the bag within the central opening of the casing, means for moving the clamping means with the gripped portion of the bag along said path beyond the supported side face of the casing, and means for moving said apertured plate and said casing in the opposite direction diametrical of the tire casing while holding the gripped portion of the bag beyond said plate to withdraw the remainder of the bag from the casing.

6. Apparatus for removing a curing bag from a tire casing, said apparatus comprising a support for engaging a tread portion of the casing, holddown means on said support for engaging a diametrically opposite tread portion of the casing, a bag-puller comprising fingers movable toward and from each other for gripping a portion of the curing bag, means for moving said fingers as a group axially of the tire casing along a straight path into and out of the space within the bead portion of the casing, an apertured plate for supporting the side of the casing from which the bag is to be withdrawn, means for adjusting said plate relative to said support independent of the position of said support, and means for moving said support in a direction diametrical of said tire to permit withdrawal of a bag along said path from said casing while said bag is being held through an aperture of said plate by said fingers.

7. Apparatus for removing a curing bag from a tire casing, said apparatus comprising an elevator for supporting a tire casing from a tread portion thereof with the axis of rotation of the tire horizontal, hold-down means on said elevator for engaging a diametrically opposite tread portion of the casing, a bag-puller comprising fingers movable toward and from each other for gripping a portion of the curing bag, means for moving said fingers as a group axially of the tire casing along a straight path into and out of the space within the bead portions of the casing, an apertured plate for supporting the side of the casing from which the bag is to be withdrawn continuously about a sidewall of the casing, means for vertically adjusting said plate relative to said support independent of the position of said support, and means for moving said support in a direction diametrical of said casing while said bag is being held through an aperture of said plate by said fingers.

8. Apparatus for removing a curing bag from a tire casing, said apparatus comprising a plate for supporting a side face of the casing entirely above its central wheel-engaging opening, said plate having an aperture therethrough, means for holding said casing with its central opening aligned with the aperture of said plate, a pair of gripping fingers movable one toward another to grip a portion of the curing bag exposed at the central opening of the casing, means for withdrawing said gripping fingers by rectilinear movement along a straight path with the gripped portion of the bag through the aperture of said plate, and means for moving said plate and the casing laterally of the path of withdrawal of said gripping fingers to draw the curing bag from the casing through the aperture of said plate.

9. The method of removing a curing bag from an annular tire casing, which method comprises supporting the tire casing against axial displacement with the central wheel-engaging opening of the tire exposed, gripping a portion of the bag inside the tire through said wheel-engaging opening, then holding said gripped portion in a fixed position and moving the tire casing diametrically away from said gripped portion until the gripped portion of the bag is exposed in said central opening, and then guiding the gripped portion laterally of the tire and moving the tire diametrically in the opposite direction to withdraw the remaining portions of the bag from inside the tire casing.

10. The method of removing a curving bag from an annular tire casing, which method comprises supporting the tire casing against axial displacement with the central wheel-engaging opening of the tire exposed, positioning a pair of opposed bag-gripping members in said opening adjacent the inside surfaces of the beads of the tire, moving the casing diametrically in one direction to urge a portion of the bag between said opposed gripping members, gripping the bag between said opposed members, holding said gripped portion in a fixed position, then moving the casing diametrically in the opposite direction while continuing to grip the bag to displace the gripped portion of the bag into said central wheel-engaging opening, and then guiding the gripped portion laterally of the tire and simultaneously moving the tire diametrically in the first-said direction to withdraw the remaining portions of the bag from inside the tire casing.

11. The method of removing a curing bag from an annular tire casing, which method comprises supporting the tire casing against axial displacement with the central wheel-engaging opening of the tire exposed, positioning a pair of closely-spaced, opposed bag-gripping members in said opening, moving the tire casing diametrically to deflect a portion of the bag against said gripping members, separating said gripping members to relieve the distortion in said deflected portion whereby the deflected portion is received between said gripping members, gripping said portion of the bag with the gripping members, holding said gripped portion in a fixed position and simultaneously moving the tire casing diametrically in one direction to displace the gripped portion into said central wheel-engaging opening, and then guiding the gripped portion axially of the tire and simultaneously moving the tire diametrically in the opposite direction to writhdraw the remaining portions of the bag from inside the tire casing.

12. Apparatus for removing a curing bag from an annular tire casing, the apparatus comprising a stationary frame structure; tire-holding means slidably supported on the frame and including elements engageable with the tread portions of the tire to hold the tire diametrically aligned with the direction in which the tire-holding means is slidable, and means engageable with the sidewall of the tire to resist axial displacement of the tire from the tread-engaging elements; means for moving the tire-holding means reciprocatingly on the frame to shift the tire diametrically; and bag-gripping members supported in the frame structure and movable reciprocatingly into and out of the central wheel-engaging opening of a tire in said tire-holding means in a straight-line motion perpendicular to the direction of said slidable movement of the tire-holding means during said slidable movement of the tire-holding means.

WALTER J. STRONG.
ROBERT E. LINDEMANN.

References Cited in the file of this patent

UNITED STATES PATENTS

| Number | Name | Date |
|---|---|---|
| 1,563,513 | McNeill | Dec. 1, 1925 |
| 1,631,281 | Moore | June 7, 1927 |
| 2,244,162 | Leguillon | June 3, 1941 |
| 2,309,590 | Honderich | Jan. 26, 1943 |
| 2,477,301 | Kastner | July 26, 1949 |
| 2,556,593 | McDonald | June 12, 1951 |